May 1, 1951     A. WAGNER     2,551,188

CAMERA CONTROL KNOB AND DATA INDICATING DEVICE

Filed Feb. 18, 1950

INVENTOR.
ADAM WAGNER
BY
Fred A. Klein.
ATTORNEY

Patented May 1, 1951

2,551,188

UNITED STATES PATENT OFFICE 2,551,188

CAMERA CONTROL KNOB AND DATA INDICATING DEVICE

Adam Wagner, Wetzlar, Germany, assignor to Ernst Leitz G. m. b. H., Wetzlar, Germany, a corporation of Germany Application February 18, 1950, Serial No. 144,922
In Germany July 6, 1949

5 Claims. (Cl. 40—70)

The present invention relates to improvements in photographers' accessories and more particularly to a new device adapted to be combined with the control knob of a camera, the device being adapted to be set so as to subsequently indicate specific characteristics or data as to the photographic films employed in the camera, to the user.

It is a general object of the present invention to provide an indicating device of the character set forth, in which the indicating means will not be detrimentally affected by or through the operation and use of the camera, so that the values indicated on the device are at all times correct in setting forth the properties, nature and characteristics of the films employed.

Accordingly, the indicating device of this invention consists of a novel arrangement which may preferably form one unitary structure with the control knob of a camera. The device is of such construction, that one part thereof is independently moveable with respect to the shaft of the camera control knob, whereas the other part thereof is fixedly connected to the shaft of the control knob and is provided with observational means adapted to permit observation of data-indicating elements, which are located below it. The indicating elements consist of a plurality of superimposed disks which carry data thereon and which are rotatable coaxially on the shaft of the control knob so as to expose the data appearing thereon through said observational means.

The invention will be better understood by reference to the following description and the accompanying drawings in which the invention is shown in one preferred embodiment.

Referring now to the drawings.

Figure 1:
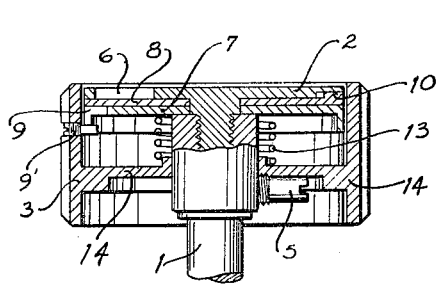
Fig. 1 is a view partly in section of the composite control knob and indicating device.
Figure 3:
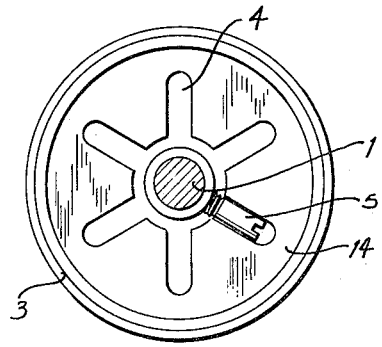
Fig. 3 is a top facial view of the coupling member.
Figure 2:
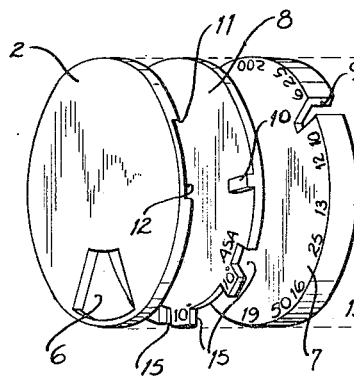
Fig. 2 is an "exploded" view in perspective of the device in side elevation.
Figure 6:
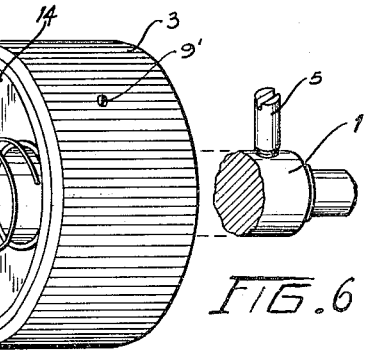
Fig. 6 is a perspective view in side elevation of the terminal end of the shaft of the device.

As shown in the drawings, the shaft 1 of the device and control knob is fixedly connected to cover member 2. The cover member 2 is provided with observational means, such as window 6. The casing 3 of the knob is arranged coaxially with respect to cover member 2 and is rotatably related thereto. Arranged below the cover member 2 are indicating elements or disks 7, 8, coaxial and superimposed with respect to each other. The disk 7 is connected to the casing or housing 3 by means of slit 9 and screw 9' fitting therein. Disk 8 is provided with a projection or trip pin 10 which engages and co-operates with shoulders 11 and 12 protruding from cover member 2. The movement of disk 8 is induced by disk 7 and occurs by means of frictional engagement between the two disks wherein spring 13 arranged coaxially to shaft 1 provides the necessary pressure to maintain friction between the two disks. The spring 13 terminates with one end on the disk 7 and with the other end upon member 14. The disk 14 is provided at its outer surface with a number of grooves 4 and this number corresponds to the number of adjustments for which indications are intended or possible. To this end the engagement pin 5 which is attached to the shaft 1 is adapted to fit the grooves 4 and by the action of spring 13 is maintained rigidly in a chosen groove. Disks 7 and 8 may be provided, for example, with data or information concerning the sensitivity of photographic materials, with information about the type of photographic film in the camera, etc. This information is provided on the periphery of the disks 7 and 8 in any suitable manner. It is also possible to employ more than two disks and more than one window 6 depending upon the scope of information desired to be recorded.

The indicating device operates substantially as follows:

When it is desired to set the device to show some given data pertaining to a certain film with which the camera has been loaded, the casing 3 of the film winding knob is lifted against the action of spring 13 and thereby coupling 4, 5 located between casing 3 and the shaft 1 becomes disengaged. Upon rotating the casing, disk 7 is engaged by pin or screw 9' through the slit 9, and disk 7 in its turn frictionally engages disk 8 to rotate. Stop or trip means 10, 11, 12 limit the rotational displacement of disk 8, since cover plate 2 does not participate in the rotation of casing 3. As the desired indications appear in the window 6 of cover plate 2, the casing 3 of the knob is set to the position which corresponds to the indication. Thus, by means of spring 13 the connection between casing 3 and shaft 1 has been reestablished, and after the engagement of coupling 4, 5, the device is again available as a film winding knob whose operation does not interfere with the indications shown through the window 6.

Figure 4:
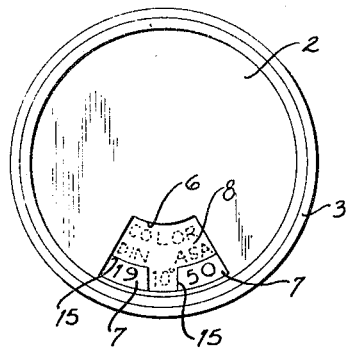
Fig. 4 is a top facial view of the cover member provided with one observational means.
Figure 5:
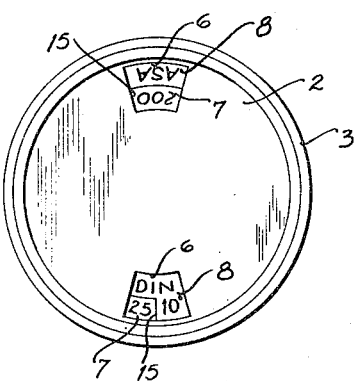
Fig. 5 is a variation of Fig. 4 showing a cover member provided with several observational means.

The limited rotation of the disk 8 enables indications as to the type of film used, as for example black-white, or color film, as shown in Fig. 4. For this purpose, the disk 8 is provided with cut out observational means 15 corresponding to both end positions of disk 8, said means 15 appearing in window 6 simultaneously with the indications on disk 7 which has been frictionally engaged during the rotation of casing 3 in either direction. Thus, the indications of disk 8 as well as those of disk 7 are caused to appear in window 6 by virtue of cut-outs 15 which permit visual observation of the indications of the disk 7 lying underneath disk 8. Disk 7 and also additional disks may be provided simultaneously with particulars about the films used in the camera and with observational means by which the view, on disks arranged underneath each other, remains unobstructed.

It will be understood that the device described herein may be modified in numerous particulars without departing from the spirit and scope of this invention as defined in the following claims.

I claim:

1. A combined camera control knob and data-indicating device, comprising a cylindrical cup-like housing, a control shaft passing substantially axially through said housing, a disk-like closure member integral with said shaft and adapted to fit into the outer end of said housing, said closure member being provided with observational means, at least one presettable disc-like indicating means intermediate said closure member and the bottom portion of said housing, said indicating means carrying film-identifying characters visible through said observational means, said bottom member of the housing being provided with a releasable coupling member adapted to form an operable connection between the control shaft and said housing.

2. A combination as claimed in claim 1, in which the indicating means comprise two disk-like members arranged coaxially, one of said members being coupled to the housing of the control knob, and being further adapted to rotate the other indicating disk by frictional engagement.

3. A combination as claimed in claim 2, wherein the frictional rotation of said disk is limited by a stop which in turn is adapted to cooperate with stop means provided upon the inner surface of the closure member.

4. A device according to claim 1, wherein said control shaft is surrounded by a coil spring coupling the said indicating disks with each other and further coupling said housing to the control shaft.

5. A device as claimed in claim 4, in which said spring abuts with one end thereof against one of said disks and with the other end against the housing bottom, said bottom being provided at the external surface thereof with a number of grooves adapted to be engaged by a rod-like coupling means integral with said shaft.

ADAM WAGNER.

REFERENCES CITED

The following references are of record in the file of this patent:

UNITED STATES PATENTS

| Number | Name | Date |
|---|---|---|
| 1,294,433 | Evers | Feb. 18, 1919 |
| 2,245,214 | Mihalyi | June 10, 1941 |
| 2,279,715 | Nagel | Apr. 14, 1942 |
| 2,350,733 | Drotning | June 6, 1944 |